(12) United States Patent
Sharma et al.

(10) Patent No.: US 7,944,241 B1
(45) Date of Patent: May 17, 2011

(54) CIRCUIT FOR GLITCHLESS SWITCHING BETWEEN ASYNCHRONOUS CLOCKS

(75) Inventors: Vivek Mohan Sharma, Sarita Vihar (IN); Navneet Gupta, Ghaziabad (IN)

(73) Assignee: STMicroelectronics Pvt. Ltd., Uttar Pradesh (IN)

( * ) Notice: Subject to any disclaimer, the term of this patent is extended or adjusted under 35 U.S.C. 154(b) by 0 days.

(21) Appl. No.: 12/697,024

(22) Filed: Jan. 29, 2010

(51) Int. Cl.
*H03K 17/76* (2006.01)
*G06F 1/04* (2006.01)
(52) U.S. Cl. .............................. 326/93; 326/16; 327/298
(58) Field of Classification Search .................... 326/93, 326/16; 327/99, 298, 407; 375/227
See application file for complete search history.

(56) References Cited

U.S. PATENT DOCUMENTS

| | | | |
|---|---|---|---|
| 5,155,380 A | 10/1992 | Hwang et al. | |
| 5,315,181 A | 5/1994 | Schowe | |
| 5,623,223 A * | 4/1997 | Pasqualini | 327/298 |
| 6,265,930 B1 | 7/2001 | Walker et al. | |
| 6,266,780 B1 | 7/2001 | Grundvig et al. | |
| 6,275,546 B1 * | 8/2001 | Miller et al. | 375/354 |
| 6,577,169 B1 | 6/2003 | Cheng | |
| 6,593,780 B2 | 7/2003 | Lammers | |

FOREIGN PATENT DOCUMENTS

JP            63259711 A   * 10/1988

* cited by examiner

*Primary Examiner* — Daniel D Chang
(74) *Attorney, Agent, or Firm* — Lisa K. Jorgenson; William J. Kubida

(57) ABSTRACT

A circuit for glitchless switching between asynchronous clocks includes a select circuit and enable circuits. The select circuit receives a selection signal for selecting one of the clock input signals and to generate enabling signals for activating the corresponding enable circuits on the basis of the current output signal. The feedback logic in the circuit ensures that at any given instance only one of the clock input signals is outputted so as to avoid the formation of glitches. The circuit can be applied to switches between any number of asynchronous clocks.

30 Claims, 11 Drawing Sheets

CIRCUIT FOR GLITCHLESS SWITCHING BETWEEN ASYNCHRONOUS CLOCKS

BACKGROUND OF THE INVENTION

1. Field of the Invention

The present invention relates to a circuit for switching between asynchronous clocks. In particular, the present invention relates to a circuit for glitchless switching between asynchronous clocks.

2. Background of the Related Art

The dynamic switching between multiple clock sources is an operation required by several kinds of applications.

The operation of computers, for instance, is based on the selection of several clock sources so as to optimize at the same time both the performances and the power consumption of the system. Applications requiring high performances of the system components such as the processor of the computer will be accordingly managed by high frequencies clock signals thereby requiring high power consumption. On the contrary, applications which can be run with reduced power consumption without affecting the quality of the results will be managed with low frequency signals.

Another example of applications involving the dynamic switching between multiple clock sources concerns the video technology wherein high definition modes (HD) and standard definition modes (SD) are managed by corresponding HD and SD clock signals having different frequencies.

One of the main problems related to the switching between multiple clock sources concerns the formation of glitches, i.e. transient pulses, in the output signal at the switching instant. Examples of glitches are spike pulses or clock periods shorter than the pulses of fastest clock source between the multiplicity of clock sources present in the system.

Glitches are particularly undesirable because they may cause critical instabilities in the entire system. In particular, the presence of glitches may cause undefined states for the system which can ultimately lead to crashes and serious damages of the system.

In order to remove glitches, solutions have been proposed based on the concept of glitch check management. In particular, these solutions are based on the application of detection and filtering circuits for detecting the presence of glitches in the relevant signal and for filtering them out. Nevertheless, these solutions require complicated architectures which are accordingly expensive and difficult to implement. Moreover, these solutions do not provide a satisfactory solution for the above problem because the filtering may not allow for the complete removal of the glitches.

Given these problems with the existing technology, it would be advantageous to provide a system which allows the output of glitchless signals, at the same time dispensing with the need for glitch check management.

SUMMARY OF THE INVENTION

The present invention exploits the fact that the actual clock output signal may be fed back to the select circuit so as to generate delayed enabling signals on the basis of the actual clock output signal so as to avoid the formation of glitches when switching between asynchronous clocks.

According to a first aspect of the invention, a clock switch circuit for selectively generating a clock output signal from a selected one of at least two clock input signals is provided, wherein the clock switch circuit comprises a select circuit comprising an input for receiving a selection signal for selecting one of the at least two clock input signals and at least two outputs for outputting at least two delayed enabling signals and at least two enabling signals, at least two enable circuits, each of the enable circuits comprising an input for receiving one of the at least two clock input signals, an input for receiving one of the delayed enabling signals, an input for receiving one of said enabling signals and an output for outputting an internal clock signal, a gate adapted to receive the internal clock signals output by the at least two enable circuits and two output set clock output signals corresponding to the selecting one of the at least two clock input signals, wherein the clock output signal is fed back to the select circuit so as to generate the at least two delayed enabling signals and the at least two enabling signals on the basis of the clock output signal.

According to a second aspect, the invention provides a clock switch circuit for selectively generating a clock output signal from a selected one of at least two clock input signals, wherein the clock switch circuit comprises a select circuit comprising an input for receiving a selection signal for selecting one of the at least two clock input signals and at least two outputs for outputting at least two delayed enabling signals and at least two enabling signals, at least two enable circuits, each of the enable circuits comprising an input for receiving one of the at least two clock input signals, an input for receiving one of the delayed enabling signals, an input for receiving one of the enabling signals and an output for outputting an internal clock signal, and a gate adapted to receive the internal clock signals output by the at least two enable circuits and to output the clock output signal corresponding to the selected one of the at least two clock input signals wherein the select circuit is further provided with an input for receiving a select circuit test signal for performing tests on the clock switch circuit.

According to a third aspect of the present invention, a digital clock controller for a video pipeline is provided, wherein the digital clock controller comprises a clock switch, a divider, a clock multiplexer and a clock aligner, wherein the clock switch circuit comprises a select circuit comprising an input for receiving a selection signal for selecting one of the at least two clock input signals and at least two outputs for outputting at least two delayed enabling signals and at least two enabling signals, at least two enable circuits, each of the enable circuits comprising an input for receiving one of the at least two clock input signals, an input for receiving one of the delayed enabling signals, an input for receiving one of the enabling signals and an output for outputting an internal clock signal, a gate adapted to receive the internal clock signals output by the at least two enable circuits and two output set clock output signals corresponding to the selecting one of the at least two clock input signals, wherein the clock output signal is fed back to the select circuit so as to generate the at least two delayed enabling signals and the at least two enabling signals on the basis of the clock output signal.

According to a fourth aspect of the present invention, there is provided a digital clock controller for a video pipeline, wherein the digital clock controller comprises a clock switch, a divider, a clock multiplexer and a clock aligner, wherein the clock switch comprises a select circuit comprising an input for receiving a selection signal for selecting one of the at least two clock input signals and at least two outputs for outputting at least two delayed enabling signals and at least two enabling signals, at least two enable circuits, each of the enable circuits comprising an input for receiving one of the at least two clock input signals, an input for receiving one of the delayed enabling signals, an input for receiving one of the enabling signals and an output for outputting an internal clock signal, and a gate adapted to receive the internal clock signals output by the at least two enable circuits and to output the clock output signal corresponding to the selected one of the at least two clock input signals wherein the select circuit is further provided with an input for receiving a select circuit test signal for performing tests on the clock switch circuit.

BRIEF DESCRIPTION OF THE DRAWINGS

The accompanying drawings are incorporated into and form a part of a specification to illustrate several embodiments of the present invention. These drawings together with the description, serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, in which like reference numbers refer to like elements and wherein.

DETAILED DESCRIPTION OF PREFERRED EMBODIMENTS

Figure 1A:
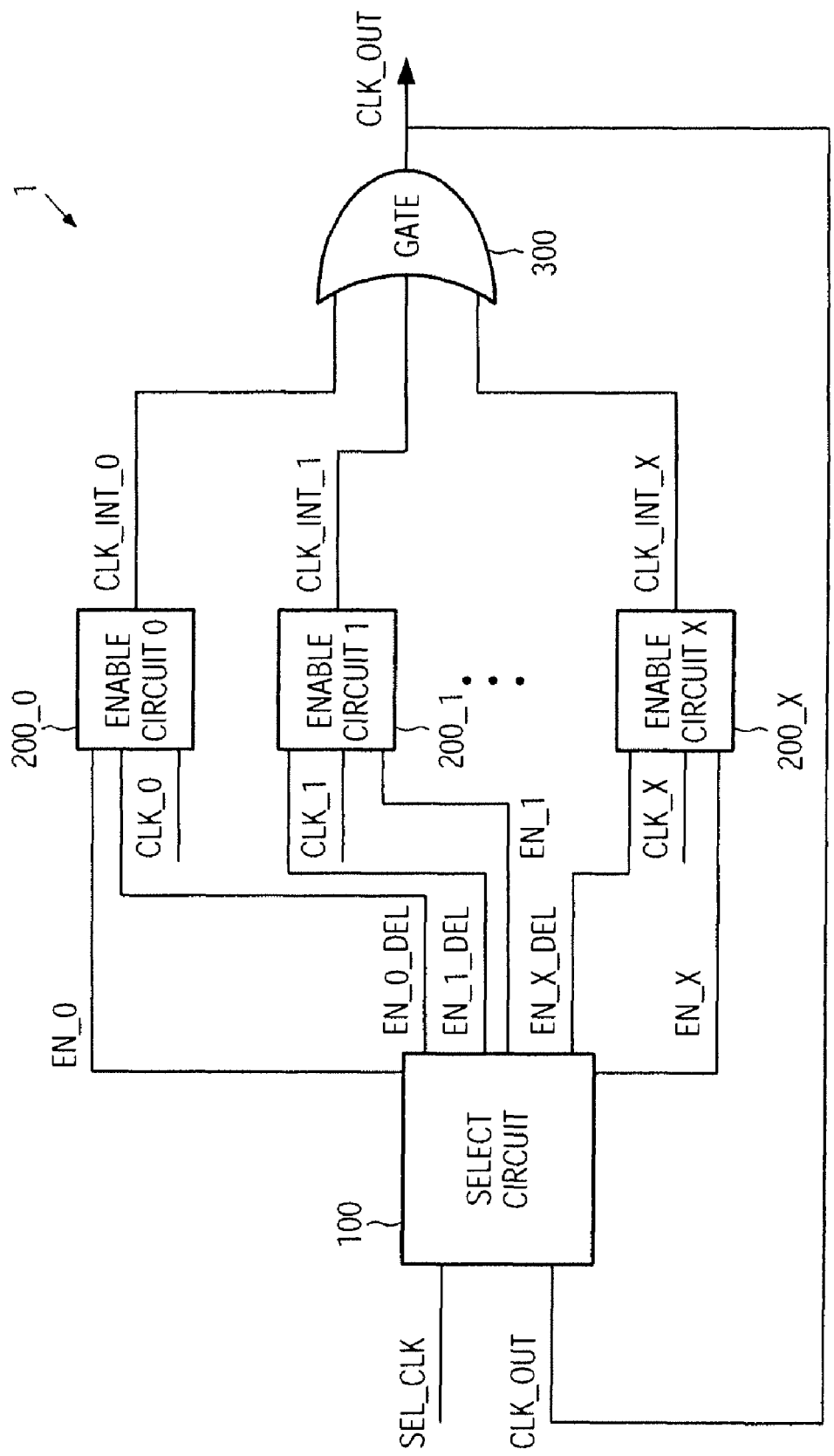
FIG. 1A schematically shows a first variant of an architecture of a clock switch circuit according to an embodiment of the present invention.

FIG. 1A schematically shows the architecture of a clock switch circuit 1 for selectively generating a clock output signal CLK_OUT from a selected one of a plurality of clock input signals CLK_0, CLK_1, CLK_X. The clock switch circuit 1 comprises a select circuit 100 comprising an input for receiving a selection signal SEL_CLK for selecting one of the clock input signals CLK_0, CLK_1, CLK_X, and a plurality of outputs for outputting a plurality of delayed enabling signals EN_0_DEL, EN_1_DEL, EN_X_DEL. The clock switch circuit 1 further comprises a plurality of enable circuits 200_0, 200_1, 200_X. Each of the enable circuits 200_X receives in input the corresponding clock input signal CLK_X and the corresponding delayed enabling signal EN_X_DEL output by the select circuit 100. Each of the enable circuits 200_X further comprises an output for outputting an internal clock signal CLK_INT_X.

Moreover, the select circuit 100 is further provided with a plurality of outputs for outputting a plurality of enabling signals EN_0, EN_1, EN_X. Each of the enable circuits 200_X further receives in input the corresponding enabling signal EN_X output by the select circuit 100.

The internal clock signals CLK_INT_0, CLK_INT_1, CLK_INT_X output by the enable circuits 200_0, 200_1, 200_X, respectively, are input into a logic gate 300 which finally outputs the clock output signal CLK_OUT corresponding to the selected one of the plurality of clock input signals CLK_0, CLK_1, CLK_X. The logic gate 300 may for instance be an OR gate. The clock output signal CLK_OUT is fed back to the select circuit 100 so as to generate the plurality of delayed enabling signals EN_0_DEL, EN_1_DEL, EN_X_DEL and the plurality of enabling signals EN_0, EN_1, EN_X on the basis of the clock output signal CLK_OUT. The dots in FIG. 1A indicate that the clock switch circuit 1 may be provided with an arbitrary number of enable circuits 200_X so as to allow the switching between a corresponding arbitrary number of clock input signals CLK_X.

Figure 1B:
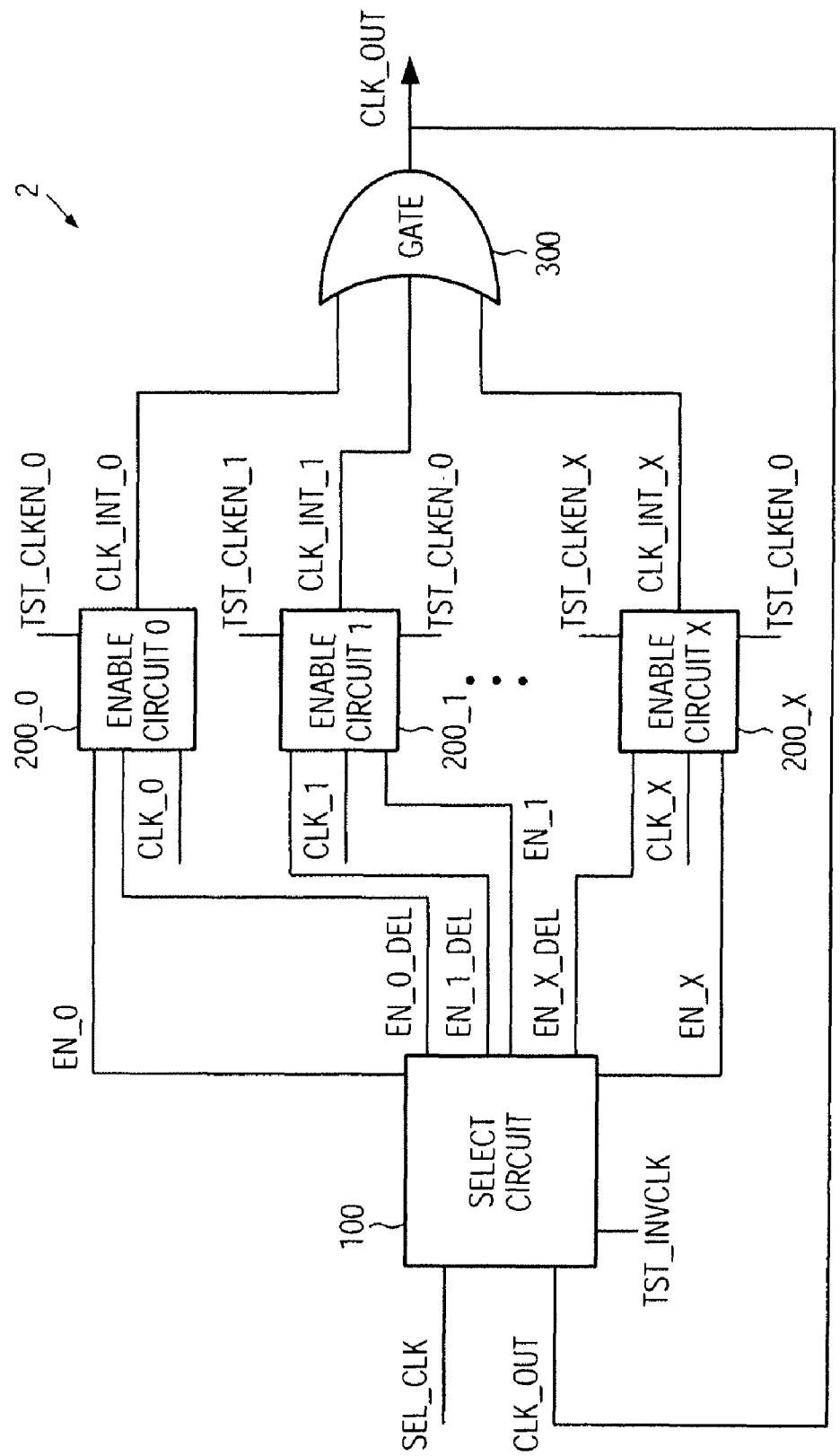
FIG. 1B schematically shows a second variant of an architecture of a clock switch circuit according to an embodiment of the present invention.

FIG. 1B schematically shows the architecture of a clock switch circuit 2 according to a further aspect of the present invention. Similarly to the clock switch circuit 1 shown in FIG. 1A, the clock switch circuit 2 comprises a select circuit 100, a plurality of enable circuits 200_0, 200_1, 200_X and a gate 300. The select circuit 100 receives in input a selection signal SEL_CLK for selecting one of the clock input signals CLK_0, CLK_1, CLK_X, and outputs a plurality of delayed enabling signals EN_0_DEL, EN_1_DEL, EN_X_DEL and the plurality of enabling signals EN_0, EN_1, EN_X. Each of the delayed enabling signals EN_X_DEL is input into the corresponding enable circuit 200_X together with the corresponding clock input signal CLK_X. Each of the enable circuits 200_X outputs an internal clock signal CLK_INT_X. X. Moreover, the select circuit 100 is further provided with a plurality of outputs for outputting a plurality of enabling signals EN_0, EN_1, EN_X. Each of the enable circuits 200_X further receives in input the corresponding enabling signal EN_X output by the select circuit 100.

The internal clock signals CLK_INT_0, CLK_INT_1, CLK_INT_X output by the enable circuits 200_0, 200_1, 200_X, respectively, are input into a logic gate 300 which finally outputs the clock output signal CLK_OUT corresponding to the selected one of the plurality of clock input signals CLK_0, CLK_1, CLK_X. The logic gate 300 may be for instance an OR gate. The clock output signal CLK_OUT is fed back to the select circuit 100 so as to generate the plurality of delayed enabling signals EN_0_DEL, EN_1_DEL, EN_X_DEL and the plurality of enabling signals EN_0, EN_1, EN_X on the basis of the clock output signal CLK_OUT. Moreover, the select circuit 100 of the clock switch circuit 2 shown in FIG. 1B is further adapted to receive in input a select circuit test signal TST_INVCLK for performing tests on the clock switch circuit 2. Furthermore, each of the enable circuits 200_X is adapted to receive an enable circuit test signal TST_CLKEN_X for performing tests on the clock switch circuit 2. The enable circuits 200_X, with X≠0, are adapted to receive in input the TST_CLK_0 signal at the gate 220.

The dots in FIG. 1B indicate that the clock switch circuit 2 may be provided with an arbitrary number of enable circuits 200_X so as to allow the switching between a corresponding arbitrary number of clock input signals CLK_X.

Figure 2:
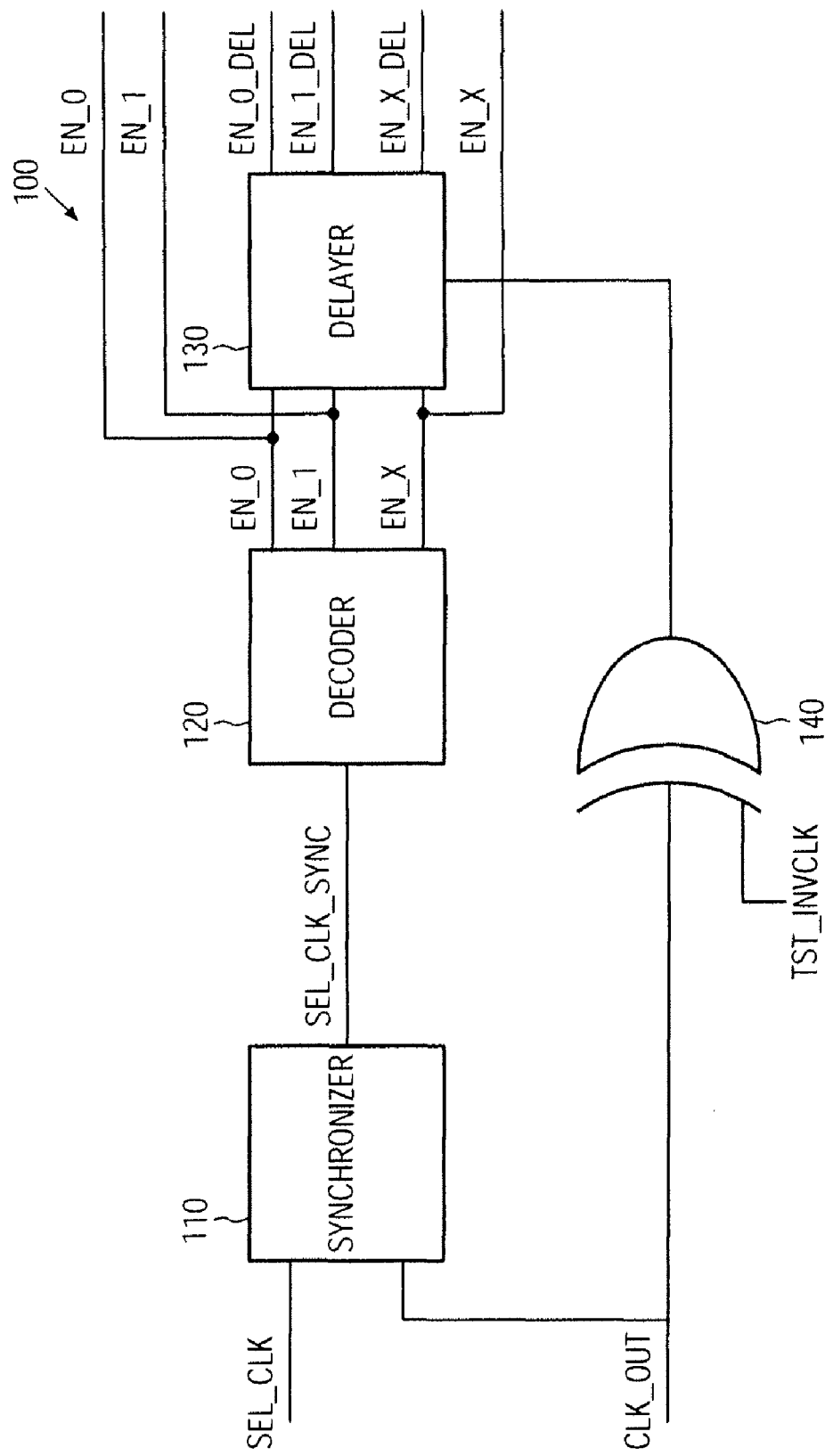
FIG. 2 schematically shows an architecture of a select circuit for a clock switch circuit according to an embodiment of the present invention.

FIG. 2 schematically shows the architecture of a select circuit 100 for a clock switch circuit according to the present invention. The select circuit 100 comprises a synchronizer 110 receiving in input the selection signal SEL_CLK for selecting one of the clock input signals and the clock output signal CLK_OUT output by the clock switch circuit. The synchronizer 110 synchronizes the selection signals SEL_CLK in the clock domain of the clock output signal CLK_OUT so as to avoid metastability problems for the system. Accordingly, the synchronizer 110 outputs a synchronized selection signal SEL_CLK_SYNC. The select circuit 100 further comprises a decoder 120 for decoding the synchronized selection signal SEL_CLK_SYNC and for generating a plurality of enabling signals EN_0, EN_1, EN_X. The decoder 120 may for instance perform one-hot decoding of the synchronized selection signal SEL_CLK_SYNC to generate enabling signals EN_0, EN_1, EN_X for each of the source clocks. Accordingly, at any given time, only one of the enabling signals EN_0, EN_1, EN_X is at logic_1 while all other enabling signals are at logic_0.

The plurality of enabling signals EN_0, EN_1, EN_X output by the decoder 120 are input into a delayer 130. Furthermore, the plurality of enabling signals EN_0, EN_1, EN_X output by the decoder 120 are further input into the corresponding enable circuits 200_0, 200_1, 200_X, respectively.

The delayer 130 further receives in input the clock output signal CLK_OUT output by the clock switch circuit. The delayer 130 outputs the plurality of delayed enabling signals EN_0_DEL, EN_1_DEL, EN_X_DEL which will be input in the corresponding enable circuits 200_0, 200_1, 200_X, respectively.

According to the architecture shown in FIG. 2, the clock output signal CLK_OUT output by the clock switch circuit is, therefore, input into both the synchronizer 110 and the delayer 130 of the select circuit 100.

The select circuit 100 schematically shown in FIG. 2 further comprises a logic gate 140 adapted to receive in input a select circuit test signal TST_INVCLK for performing tests on the clock switch circuit. The logic gate 140 is further adapted to receive in input the clock output signal CLK_OUT. The output of the logic gate 140 is input into the delayer 130.

Figure 3A:
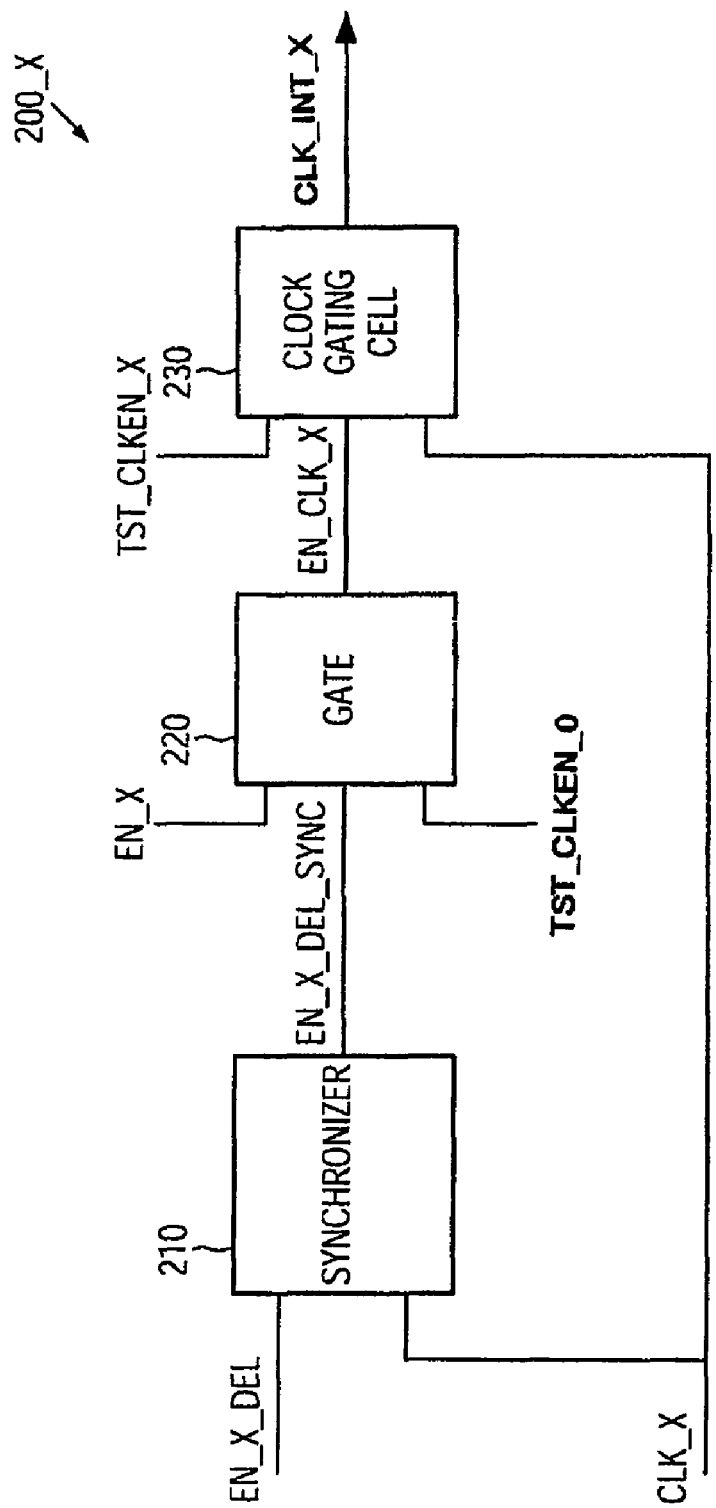
FIG. 3A schematically shows an architecture of an enable circuit for a clock switch circuit according to an embodiment of the present invention.

FIG. 3A schematically displays the architecture of one of the enable circuits 200_X of the clock switch circuit according to the present invention. The enable circuit 200_X receives in input the corresponding delayed enabling signal EN_X_DEL output by the select circuit 100 and the clock input signal CLK_X. On the basis of these two signals, the enable circuit 200_X generates the internal clock signal CLK_INT_X.

The enable circuit 200_X shown in FIG. 3A comprises a synchronizer 210 for synchronizing the delayed enabling signal EN_X_DEL in the clock domain of the clock input signal CLK_X. Accordingly, the synchronizer outputs the synchronized delayed enabling signal EN_X_DEL_SYNC. The enabling circuit 200_X is further provided with a logic gate 220 for receiving in input the synchronized delayed enabling signal EN_X_DEL_SYNC output by the synchronizer 210 and the enabling signal EN_X output by the select circuit 100. The logic gate 220 outputs the internal enabling signal EN_CLK_X. The enabling circuit 200_X further comprises a clock gating cell 230 receiving in input the internal enabling signal EN_CLK_X output by the logic gate 220 and the clock input signal CLK_X. On the basis of these signals, the clock gating cell 230 outputs the internal clock signal CLK_INT_X.

The enable circuit 200_X schematically shown in FIG. 3A is further adapted to receive in input a first enable circuit test signal TST_CLKEN_0 and a second enable circuit test signal TST_CLKEN_X for performing tests on the clock switch circuit. In particular, the gate 220 of the enable circuit 200_X is further adapted to receive in input the first enable circuit test signal TST_CLKEN_0 and the clock gating cell 230 is further adapted to receive in input the second enable circuit test signal TST_CLKEN_X.

Figure 3B:
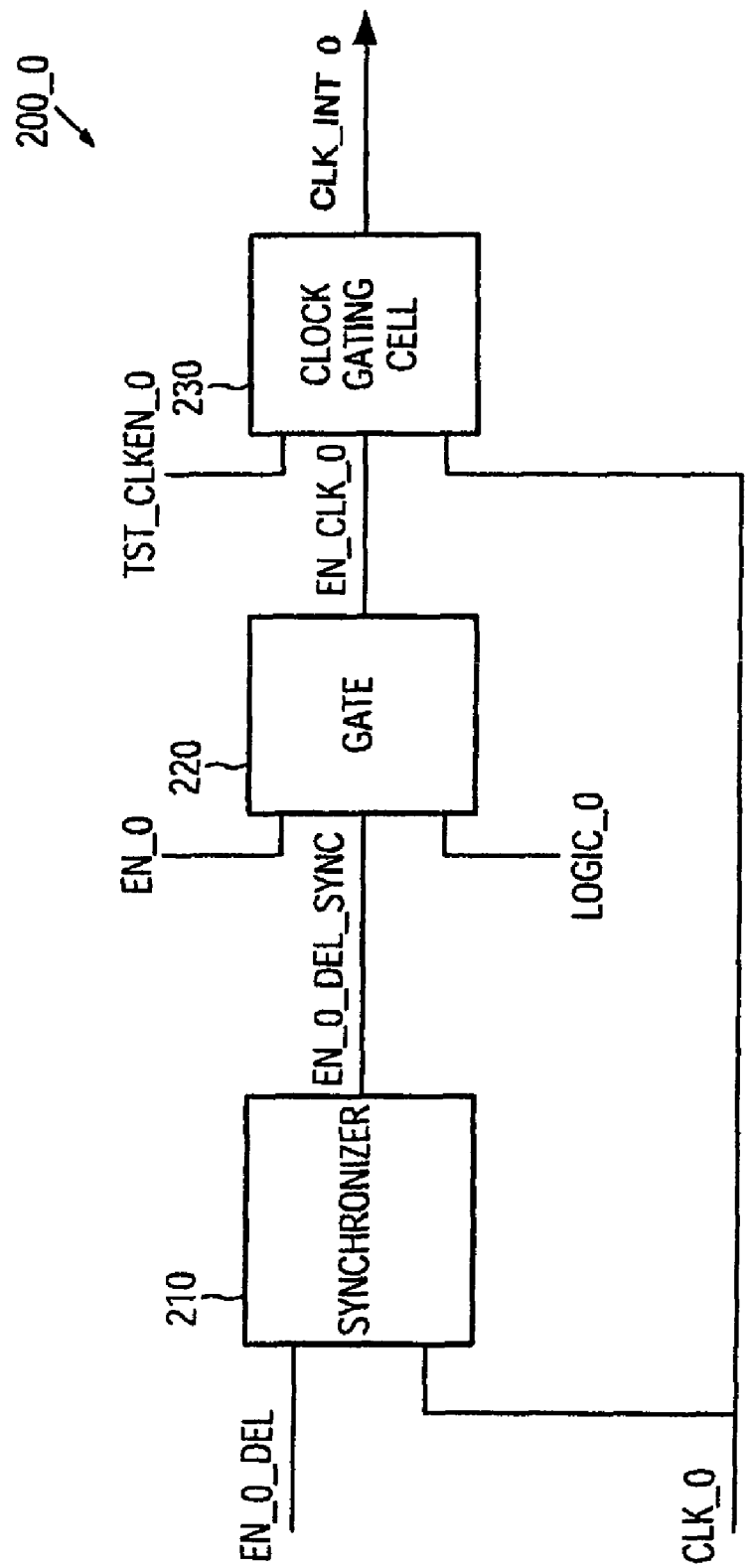
FIG. 3B schematically shows a further architecture of an enable circuit for a clock switch circuit according to an embodiment of the present invention.

FIG. 3B schematically displays the architecture of the enable circuits 200_0 of the clock switch circuit according to the present invention. The enable circuit 200_0 receives in input the corresponding enabling signal EN_0 and the delayed enabling signal EN_0_DEL output by the select circuit 100 and the clock input signal CLK_0. On the basis of these three signals, the enable circuit 200_0 generates the internal clock signal CLK_INT_0.

The enable circuit 200_0 shown in FIG. 3B comprises a synchronizer 210 for synchronizing the delayed enabling signal EN_0_DEL in the clock domain of the clock input signal CLK_0. Accordingly, the synchronizer outputs the synchronized delayed enabling signal EN_0_DEL_SYNC. The enabling circuit 200_0 is further provided with a logic gate 220 for receiving in input the synchronized delayed enabling signal EN_0_DEL_SYNC output by the synchronizer 210 and the enabling signal EN_0 output by the select circuit 100. The logic gate 220 outputs the internal enabling signal EN_CLK_0. The enabling circuit 200_0 further comprises a clock gating cell 230 receiving in input the internal enabling signal EN_CLK_0 output by the logic gate 220 and the clock input signal CLK_0. On the basis of these signals, the clock gating cell 230 outputs the internal clock signal CLK_INT_0.

The enable circuit 200_0 schematically shown in FIG. 3B is further adapted to receive in input a logic_0 signal and an enable circuit test signal TST_CLKEN_0 for performing tests on the clock switch circuit. In particular, the gate 220 of the enable circuit 200_0 is further adapted to receive in input the logic_0 signal and the clock gating cell 230 is further adapted to receive in input the enable circuit test signal TST_CLKEN_0.

The execution of tests on the clock switch circuit of the present invention is described in detail below. Moreover, even if in the embodiments shown in FIGS. 3A and 3B it is displayed that the enable circuit 200_0 is adapted to receive in input the logic_0 signal at the gate 220 while the enable circuits 200_X, with X≠0, are adapted to receive in input the TST_CLKEN_0 signal at the gate 220, any of the enable circuits 200_X, with X≠0, may be adapted to receive in input the logic_0 signal at the gate 220 instead of the TST_CLKEN_0 signal so as to select any source clock CLK_X during the test mode as explained in detail below.

Figure 4:
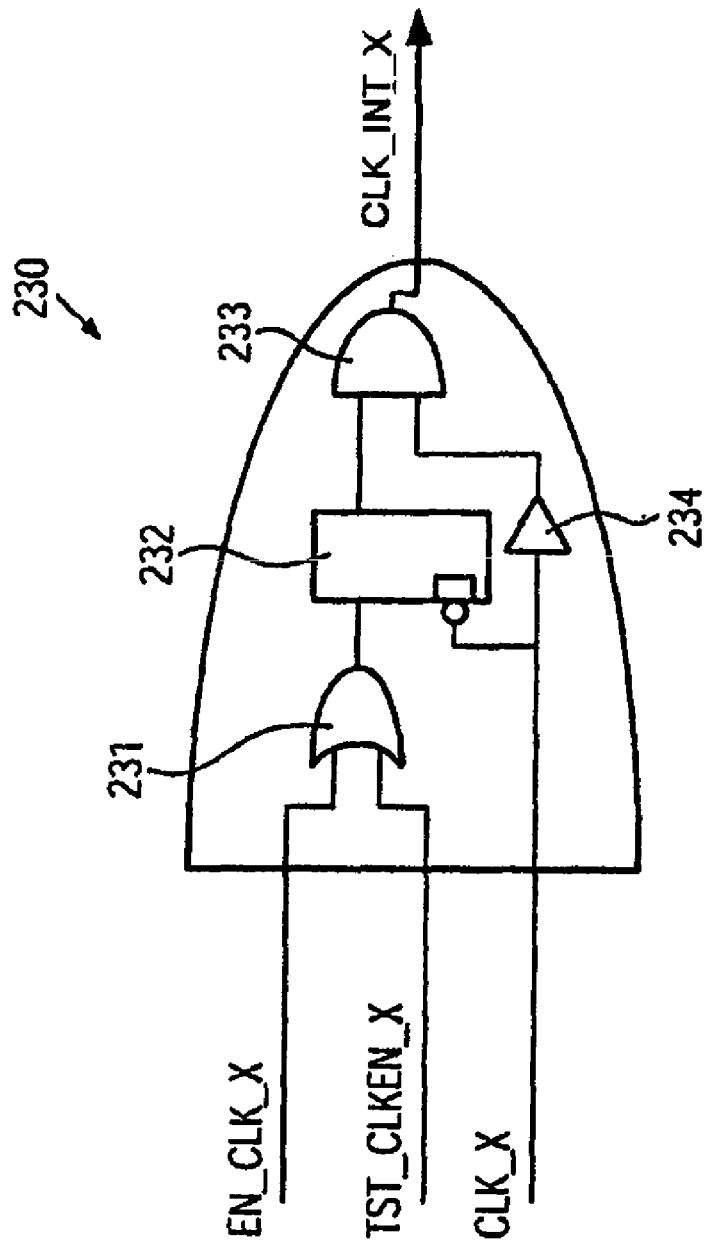
FIG. 4 schematically shows an architecture of a clock gating cell for an enable circuit for a clock switch circuit according to an embodiment of the present invention.

FIG. 4 schematically shows the architecture of a clock gating cell 230 for the enable circuit 200_X. The clock gating cell comprises three inputs and one output. The clock gating cell 230 receives in input the internal enabling signal EN_CLK_X output by the logic gate 220 of the enable circuit 200_X, the second enable circuit test signal TST_CLKEN_X and the clock input signal CLK_X. The internal enabling signal EN_CLK_X and the second enable circuit test signal TST_CLKEN_X are input into a logic gate 231. The logic gate 231 may be for instance an OR gate. The output of the logic gate 231 is input into a latch 232 enabled by the clock input signal CLK_X. The latch 232 may be an active_low latch. The latch 232 delays the internal enabling signal EN_CLK_X by a half-clock period of the clock input signal CLK_X. The output of the latch 232 is input into a logic gate 233 further receiving in input the clock input signal CLK_X. The gate 233 may be an AND gate. The clock gating cell 230 outputs the internal clock signal CLK_INT_X.

The clock gating cell 230 may be further provided with an amplifier 234 on the line connecting the input for the clock input signal CLK_X with the gate 233. The amplifier may be employed for compensating the delay added on the internal enabling signal EN_CLK_X due to the presence of the logic gate 231 and of the latch 232. For instance, the delay added on the internal enabling signal EN_CLK_X may be due to the propagation delay inside the latch 232 and the net delay of the net connecting the output of latch 232 to the input of logic gate 233.

Figure 5:
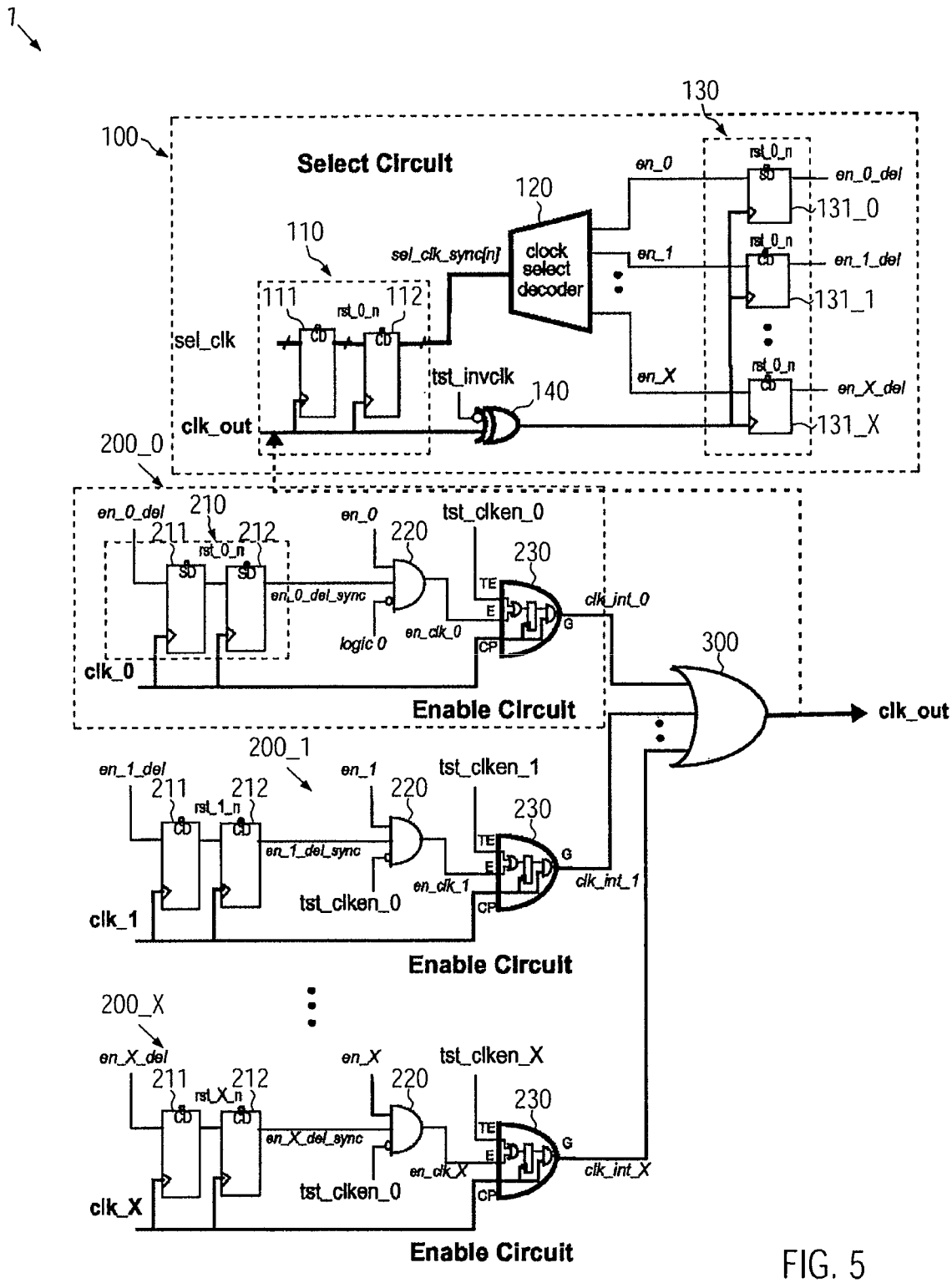
FIG. 5 illustrates the architecture of a clock switch circuit according to an embodiment of the present invention for switching between a plurality of clock input signals.

FIG. 5 illustrates the architecture of a clock switch circuit according to the present invention. The clock switch circuit 1 displayed in FIG. 5 is adapted to switch between a plurality of clock input signals CLK_0, CLK_1, CLK_X. Accordingly, the clock switch circuit is provided with a plurality of corresponding enable circuits 200_0, 200_1, 200_X. Moreover, the clock switch circuit 1 is provided with a select circuit 100 for generating a plurality of delayed enabling signals EN_0_DEL, EN_1_DEL, EN_X_DEL and a plurality of enabling signals EN_0, EN_1, EN_X to be input into the corresponding enable circuits 200_0, 200_1, 200_X, respectively, and with a logic gate 300 outputting the clock output signal CLK_OUT.

The dots in FIG. 5 indicate that the clock switch circuit 1 may be provided with an arbitrary number of enable circuits 200_X so as to allow the switching between a corresponding arbitrary number of clock input signals CLK_X.

The synchronizer 110 of the select circuit 100 comprises two flip flops 111 and 112 for synchronizing the selection signal SEL_CLK in the domain of the clock output signal CLK_OUT. In the case such as the one shown in FIG. 5 wherein more than two clock sources are employed, the synchronizer 110 of the select circuit may be adapted to first gray encode the selection signal SEL_CLK in the source clock domain of the corresponding clock sources and, after double synchronization in the domain of the clock output signal CLK_OUT by means of the flip flops 111 and 112, to gray decode the signal so as to extract the synchronized selection signal SEL_CLK_SYNC for further decoding by means of the decoder 120.

The delayer 130 of the select circuit 100 comprises a plurality of flip flops 131_0, 131_1, 131_X. Each of the flip flops 131_X is adapted to delay the corresponding enabling signal EN_X output by the decoder 120 of the select circuit 100 on the basis of the output clock signal CLK_OUT so as to generate the delayed enabling signal EN_X_DEL. In particular, each of the flip flops 131_X may be adapted to delay the enabling signal EN_X by half-clock period of the clock output signal CLK_OUT. This can be achieved, for instance, by clocking each of the flip flops 131_X on the clock output signal CLK_OUT inverted.

Each of the enabling signals EN_X and the corresponding delayed enabling signal EN_X_DEL generated by the select circuit 100 is input into the corresponding enable circuit 200_X so as to form a sequential loopback to safely enable or disable the corresponding source clocks.

Each of the synchronizers 210 of the enable circuit 200_X comprises two flip flops 211 and 212 for double synchronizing the delayed enabling signal EN_X_DEL in the domain of the corresponding clock input signal CLK_X. This synchronization is performed because the delayed enabling signal EN_X_DEL output by the select circuit 100, and accordingly resulting from the synchronization performed therein, is synchronous only to the source clock currently being selected to generate the output clock signal CLK_OUT. Accordingly, the delayed enabling signal EN_X_DEL is asynchronous to all the clock sources except to the one currently selected. The synchronizers 210 of each of the enable circuits 200_X synchronizes therefore the delayed enabling signal EN_X_DEL in the domain of the corresponding clock input signal CLK_X.

In the following, the reset setup for the clock switch circuit 1 shown in FIG. 5 will be described. The clock switch circuit 1 shown in FIG. 5 is configured to output the clock input signal CLK_0 as clock output signal CLK_OUT when reset is active. Nevertheless, it has to be understood that the clock switch circuit 1 could be configured to output any of the other clock input signals CLK_X as clock output signal CLK_OUT when reset is active.

The flip flops 111 and 112 of the select circuit 100 are adapted to be cleared (CD) when the reset signal RST_0_N is active. Accordingly, when the reset signal RST_0_N is active, the value of the synchronized selection signal SEL_CLK_SYNC is set to 0 so as to select the clock input signal CLK_0 as the clock output signal CLK_OUT. In particular, all the enabling signals EN_X are set to logic_0 except the enabling signal EN_0 which, on the contrary, is set to logic_1.

Moreover, the flip flops 131_X, with X≠0, of the select circuit 100 are adapted to be cleared (CD) when the reset signal RST_0_N is active. On the contrary, the flip flop 131_0 of the select circuit 100 is set (SD) when the reset signal RST_0_N is active. Accordingly, when the reset signal RST_0_N is active, all the delayed enabling signals EN_X_DEL are set to logic_0 except EN_0_DEL which, on the contrary, is set to logic_1.

Moreover, the flip flops 211 and 212 of the enable circuit 200_0 are set (SD) when the reset signal RST_0_N is active. On the contrary, the flip flops 211 and 212 of the other enable circuits 200_X, with X≠0, are reset (CD) when the corresponding reset signal RST_X_N is active. This is done to guarantee that during reset the clock input signal CLK_0 is selected as clock output signal CLK_OUT.

Figure 6:
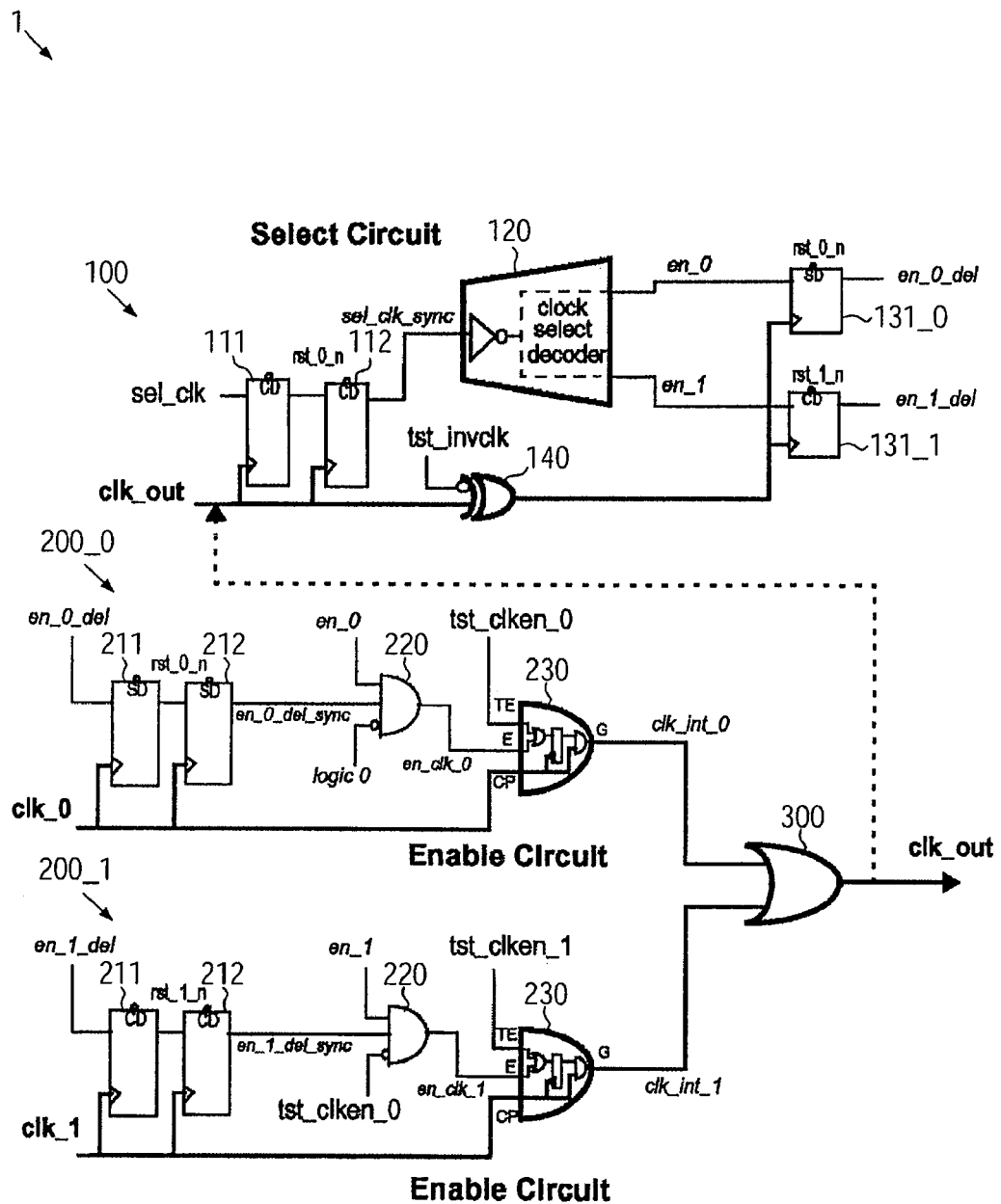
FIG. 6 illustrates the architecture of a clock switch circuit according to an embodiment of the present invention for switching between two clock input signals.

FIG. 6 schematically displays the architecture of a clock switch circuit according to the present invention for generating a clock output signal from two clock input signals CLK_0 and CLK_1. The clock switch circuit shown in FIG. 6 accordingly comprises two enable circuits 200_0 and 200_1 receiving in input the clock input signals CLK_0 and CLK_1 and the delayed enabling signals EN_0_DEL and EN_1_DEL, respectively, output by the select circuit 100.

In particular, the select circuit 100 comprises a dual stage flip flop based synchronizer 110 comprising two flip flops 111 and 112 for synchronizing the selection signal SEL_CLK in the clock domain of the clock output signal CLK_OUT. Since the clock input signals are two, no gray encoding and gray decoding is needed at this stage for the selection signal SEL_CLK, contrary to the case wherein the switch is performed between more than two clock input signals as described above with reference to FIG. 5.

The flip flops 111 and 112 outputs the synchronized selection signal SEL_CLK_SYNC which is subsequently decoded by the decoder 120. The decoder 120 outputs, accordingly, the enabling signals EN_0 and EN_1.

The select circuit 100 further comprises two flip flops 131_0 and 131_1 for receiving in input the enabling signals EN_0 and EN_1, respectively, and for outputting the delayed enabling signals EN_0_DEL and EN_1_DEL, respectively. In particular, the flip flops 131_0 and 131_1 are clocked on the clock output signal CLK_OUT inverted so as to delay the enabling signals EN_0 and EN_1 by half clock period of the clock output signal CLK_OUT.

The enable circuit 200_0 receives in input the delayed enabling signal EN_0_DEL. The synchronizer 210 comprising the flip flops 211 and 212 synchronizes the delayed enabling signal EN_0_DEL in the clock domain of the clock input signal CLK_0 so as to generate the synchronized delayed enabling signal EN_0_DEL_SYNC. The synchronized delayed enabling signal EN_0_DEL_SYNC is input into a logic gate 220 adapted to further receive in input the enable signal EN_0 and to output the internal enabling signal EN_CLK_0. The logic gate 220 shown in FIG. 6 is an AND gate. The enabling signal EN_CLK_0 is input into a clock gating cell 230 such as the one described with reference to FIG. 4 so as to generate the internal clock signal CLK_INT_0.

Similarly, the enable circuit 200_1 receives in input the delayed enabling signal EN_1_DEL. The synchronizer 210 comprising the flip flops 211 and 212 synchronizes the delayed enabling signal EN_1_DEL in the clock domain of the clock input signal CLK_1 so as to generate the synchronized delayed enabling signal EN_1_DEL_SYNC. The synchronized delayed enabling signal EN_1_DEL_SYINC is input into a logic gate 220 adapted to further receive in input the enable signal EN_1 and to output the internal enabling signal EN_CLK_1. The logic gate 220 shown in FIG. 6 is an AND gate. The enabling signal EN_CLK_1 is input into a clock gating cell 230 such as the one described with reference to FIG. 4 so as to generate the internal clock signal CLK_INT_1.

The internal clock signals CLK_INT_0 and CLK_INT_1 are input into a logic gate 300 so as to generate the clock output signal CLK_OUT. The logic gate 300 shown in FIG. 6 is an OR gate. The clock output signal CLK_OUT is fed back to the select circuit 100 so as to generate the enabling signals EN_0 and EN_1 and the delayed enabling signals EN_0_DEL and EN_1_DEL on the basis of the clock output signal.

The clock switch circuit 1 shown in FIG. 6 is configured to output the clock input signal CLK_0 as clock output signal CLK_OUT when reset is active. Nevertheless, it has to be understood that the clock switch circuit could be also configured to output the clock input signals CLK_1 as clock output signal CLK_OUT when reset is active.

The flip flops 111 and 112 of the select circuit 100 are adapted to be cleared (CD) when the reset signal RST_0_N is active. Accordingly, when the reset signal RST_0_N is active, the value of the synchronized selection signal SEL_CLK_SYNC is set to 0 so as to select the clock input signal CLK_0 as the clock output signal CLK_OUT. In particular, the enabling signal EN_0 is set to logic_1 while the enabling signal EN_1 is set to logic_0.

Moreover, the flip flop 131_1, of the select circuit 100 is adapted to be cleared (CD) when the reset signal RST_0_N is active. On the contrary, the flip flop 131_0 of the select circuit 100 is set (SD) when the reset signal RST_0_N is active. Accordingly, when the reset signal RST_0_N is active, the delayed enabling signal EN_1_DEL is set to logic_0 while EN_0_DEL is set to logic_1.

Moreover, the flip flops 211 and 212 of the enable circuit 200_0 are set (SD) when the reset signal RST_0_N is active. On the contrary, the flip flops 211 and 212 of the enable circuit 200_1 are reset (CD) when the corresponding reset signal RST_1_N is active. This is done to guarantee that during reset the clock input signal CLK_0 is selected as clock output signal CLK_OUT.

Figure 7:
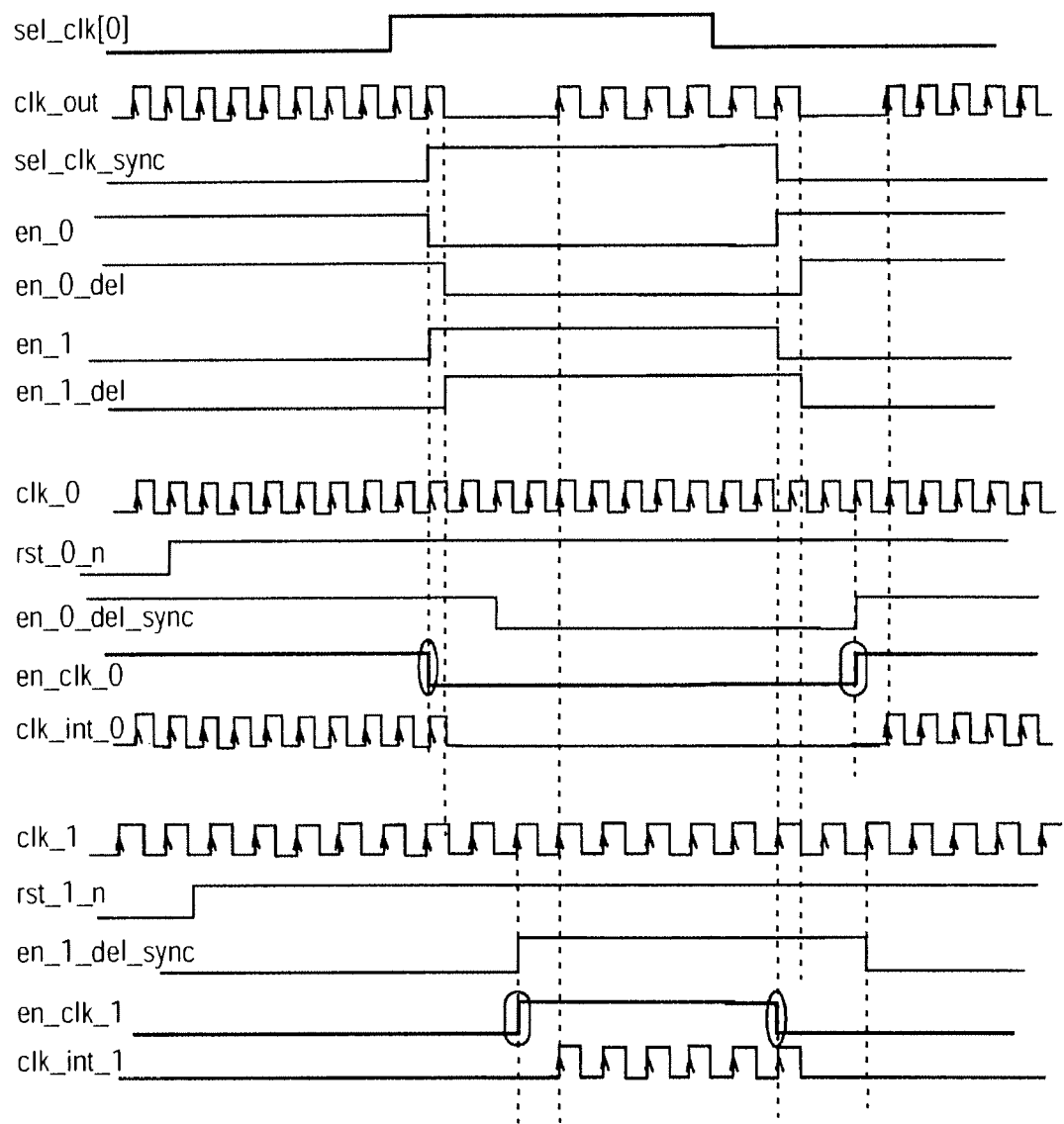
FIG. 7 shows the timing diagram of the circuit shown in FIG. 6.
Figure 8:
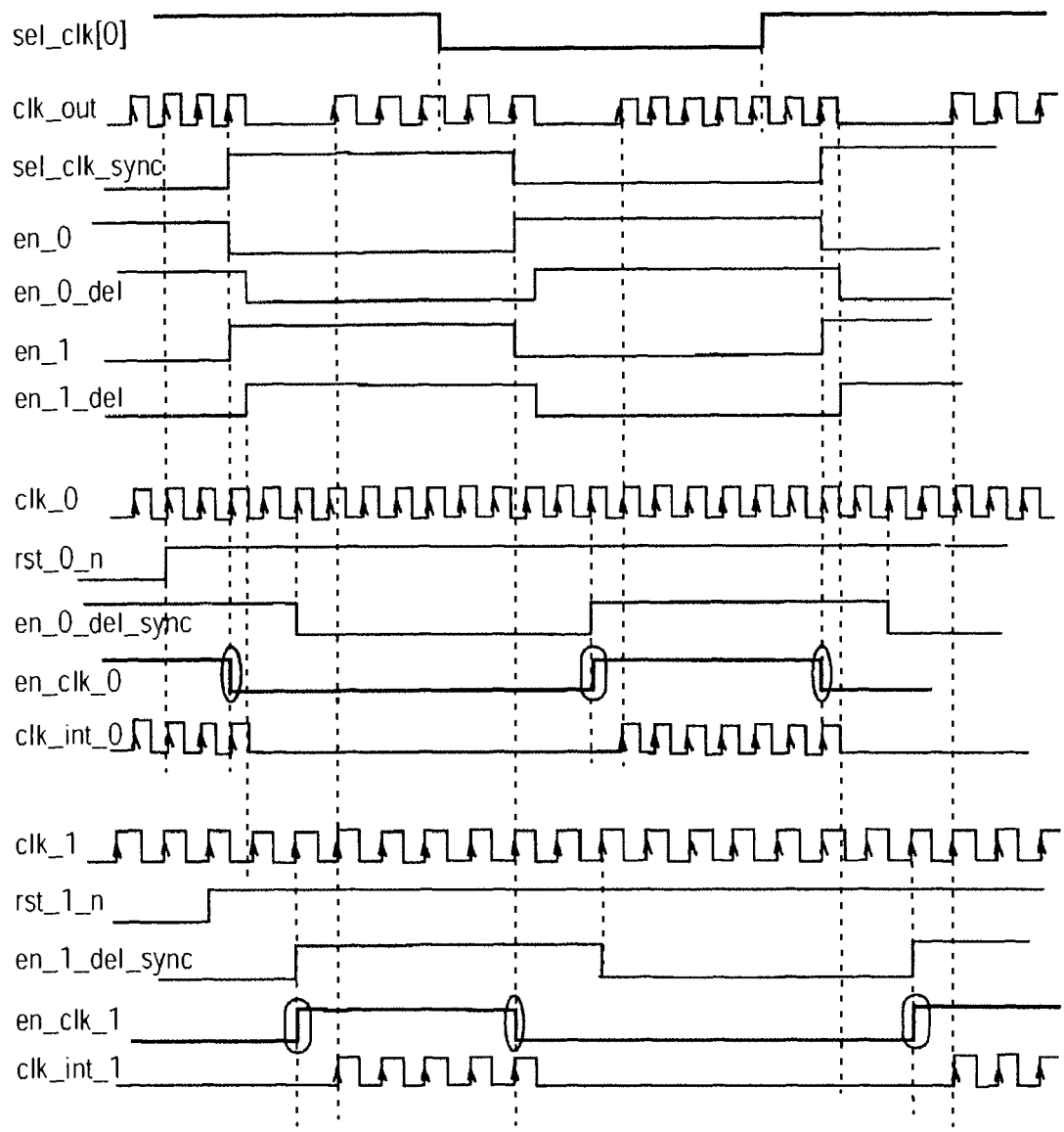
FIG. 8 shows another timing diagram of the circuit of FIG. 6.

FIGS. 7 and 8 display the timing curves displaying the various signals corresponding to the clock switch circuit shown in FIG. 6.

FIG. 7 corresponds to the case wherein the signal SEL_CLK defaults to '0' after reset while FIG. 8 corresponds to the case wherein the signal SEL_CLK defaults to '1' after reset.

As can be noted from the waveforms, each clock gating cell would be disabled synchronously and immediately using the signals EN_0 and EN_1, while, on the contrary, using the signals EN_0_DEL and EN_1_DEL, the enabling of the clock gating cell is delayed by a half period of the current CLK_OUT signal to ensure that the complementary clock gating cell has indeed been turned off. The CLK_OUT signal stops till the appropriate clock sources have been safely selected. Accordingly, as can be seen in the figures, the clock output signal CLK_OUT is glitchless.

In the following, the testability of a clock switch circuit according to the present invention will be described.

As shown in FIG. 2, the select circuit 100 may be provided with a logic gate 140 adapted to receive in input a select circuit test signal TST_INVCLK for performing tests on the clock switch circuit. The logic gate 140 is further adapted to receive in input the clock output signal CLK_OUT. The output of the logic gate 140 is input into the delayer 130. The logic gate 140 shown in FIG. 2 may be a XOR gate. The logic gate 140 allows the control on the signal that is input into the delayer 130 for generating the delayed enabling signals EN_X_DEL. In particular, by means of the select circuit test signal TST_INVCLK it is possible to input into the delayer either the inverted CLK_OUT signal or the non-inverted CLK_OUT signal. In other words, the select circuit test signal TST_INVCLK allows to enable and disable the inversion of the CLK_OUT signal which is input into the delayer 130 of the select circuit 100 in order to generate the delayed enabling signals EN_X_DEL on the basis of the corresponding enabling signals EN_X.

As shown in FIG. 3A, the enable circuit 200_X is provided with a gate 220 for receiving in input the synchronized delayed enabling signal EN_X_DEL_SYNC output by the synchronizer 210 and the enabling signal EN_X output by the select circuit 100. The logic gate 220 outputs the internal enabling signal EN_CLK_X. The gate 220 of the enable circuit 200_X shown in FIG. 3 is further adapted to receive in input the first enable circuit test signal TST_CLKEN_0. Accordingly, during test mode, it is possible to disable the clock gating cells 230 of all the enable circuits 200_X except the one of the enable circuit 200_0. In particular, as can be seen in FIGS. 3B, and 5, logic gate 220 of enable circuit 200_0 is adapted to receive in input a logic_0 signal so as to guarantee that, during test mode, the clock gating cell 230 of the enable circuit 200_0 is enabled. The logic gate 220 of the enable circuits 200_X, with X≠0, on the other hand, are adapted to be gated by the inverted TST_CLKEN_0 signal so as to turn off all clocks except the one corresponding to the clock input signal CLK_0.

It has to be noted, however, that it is possible to select any source clock CLK_X during the test mode by connecting the corresponding TST_CLKEN_X signal to turn off all other clocks except the CLK_X in a similar way to what explained above with respect to CLK_0.

Moreover, as can be seen in FIG. 5, the clock gating cell 230 of each of the enable circuits 200_X is further adapted to receive in input a second enable circuit test signal TST_CLKEN_X. In particular, the clock gating cell 230 of the enable circuit 200_0 is adapted to receive in input the enable circuit test signal TST_CLKEN_0, the clock gating cell 230 of the enable circuit 200_1 is adapted to receive in input the enable circuit test signal TST_CLKEN_1 and so on. This allows increasing the test coverage on the clock switch circuit. In particular, as explained above, during test mode, the logic gates 220 of all the enable circuits 200_X except one are adapted to be gated so as to turn off all the clock sources except one. This may result in test coverage loss. Accordingly, by means of the inputs for the TST_CLKEN_X signals in the clock gating cells 230 of each of the enable circuits 200_X it is possible to get maximum coverage without losing control of clocks in the test mode by inputting combinations of TST_CLKEN_0 and TST_CLKEN_X to the Automatic Test Pattern Generator (ATPG) tool.

Accordingly, by means of the test signals described, several functions of the clock switch circuit can be directly tested so as to easily find possible defects. The coverage of the entire clock switch circuit is guaranteed by the test signals described.

Furthermore, a scan test signal TST_SCAN_EN can be provided for creating an actual scan chain during the test mode. By enabling this signal all flip flops are connected as shift registers.

Figure 9:
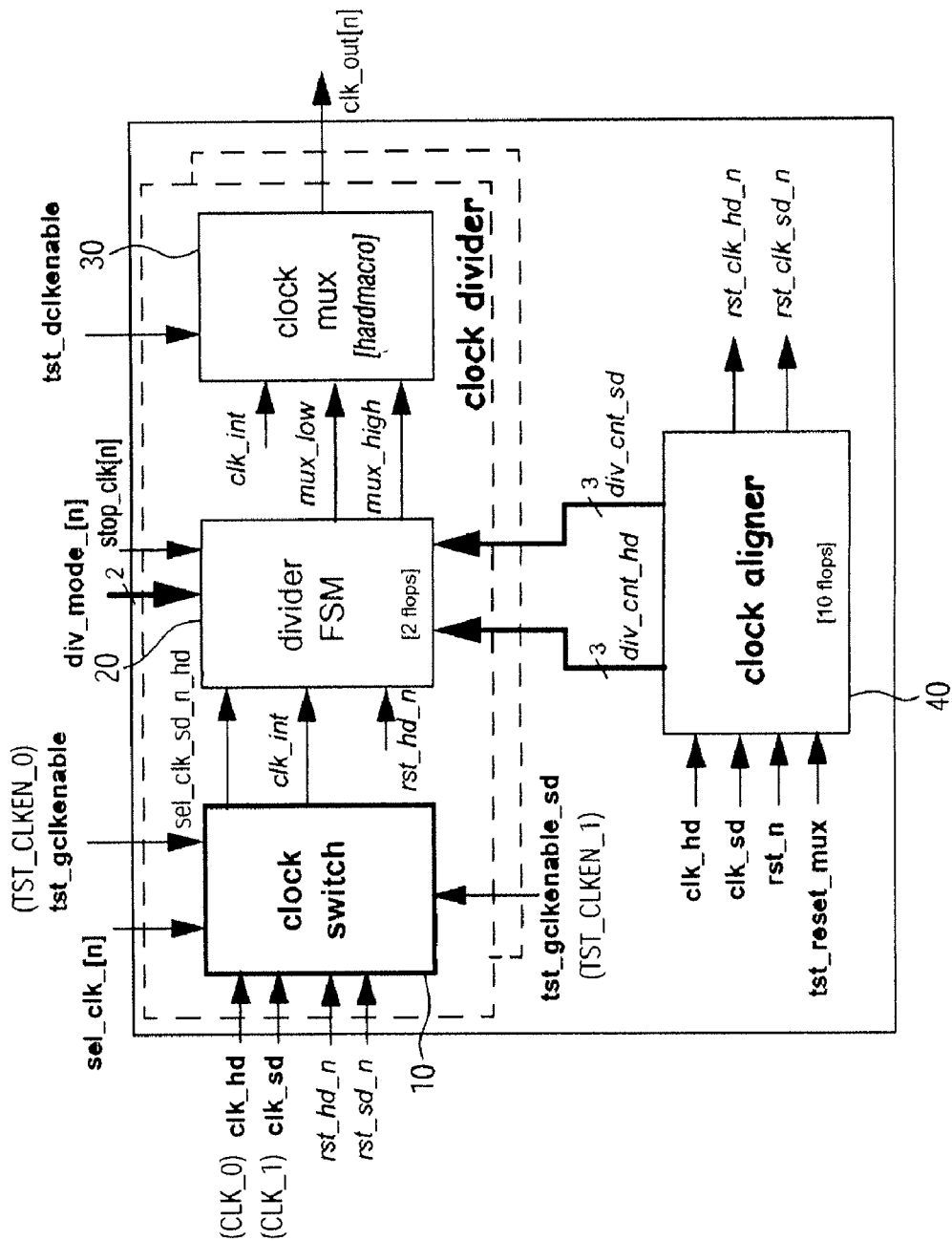
FIG. 9 schematically shows the architecture of a digital clock controller for video pipeline according to an embodiment of the present invention.

FIG. 9 schematically shows the architecture of a digital clock controller for a video pipeline according to the present invention.

Video applications generally comprise two video clock signals corresponding to a High Definition clock clk_hd and a to a Standard Definition clock clk_sd. According to the application at use, several video blocks generally require variants of these two clocks wherein the term variant refers to the divided clocks. These requirements are application specific, i.e. they change according to the application at use. Accordingly, a generic video clock divider is needed that can be programmed so as to fulfill the requirements of various video blocks.

The video output stage comprises two main data paths corresponding to the two main output formats of the chip: HD output and SD output. These two data paths are used in typical applications (such as watch and record applications) wherein the chip outputs both HD output and SD output.

The system shown in FIG. 9 comprises a central clock aligner 40 which synchronizes several instances of clock divider 20 each of which produces a divided clock from either one of the two sources. All the configuration bits are assumed to be fully asynchronous to both the HD clock and the SD clock.

The digital clock controller shown in FIG. 9 accordingly comprises a clock switch 10 allowing glitchless switching between the two asynchronous clocks corresponding to the High Definition HD clock and to the Standard Definition SD clock of the video pipeline.

The clock switch 10 may for instance comprise a select circuit comprising an input for receiving a selection signal for selecting one of the at least two clock input signals and at least two outputs for outputting at least two delayed enabling signals and at least two enabling signals, at least two enable circuits, each of the enable circuits comprising an input for receiving one of the at least two clock input signals, an input for receiving one of the delayed enabling signals, an input for receiving one of the enabling signals and an output for outputting an internal clock signal, a gate adapted to receive the internal clock signals output by the at least two enable circuits and two output set clock output signals corresponding to the selecting one of the at least two clock input signals, wherein the clock output signal is fed back to the select circuit so as to generate the at least two delayed enabling signals and at least two enabling signals on the basis of the clock output signal.

Furthermore, the clock switch 10 may comprise a select circuit comprising an input for receiving a selection signal for selecting one of the at least two clock input signals and at least two outputs for outputting at least two delayed enabling signals and at least two enabling signals, at least two enable circuits, each of the enable circuits comprising an input for receiving one of the at least two clock input signals, an input for receiving one of the delayed enabling signals, an input for receiving one of the enabling signals and an output for outputting an internal clock signal, and a gate adapted to receive the internal clock signals output by the at least two enable circuits and to output the clock output signal corresponding to the selected one of the at least two clock input signals wherein the select circuit is further provided with an input for receiving a select circuit test signal for performing tests on the clock switch circuit.

While the invention has been described with respect to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

For instance, any arbitrary number of clock signals may be switched by means of the inventive switching circuitry.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

We claim:

1. A clock switch circuit for selectively generating a clock output signal from a selected one of at least two clock input signals, said clock switch circuit comprising:
   a select circuit comprising an input for receiving a selection signal for selecting one of the at least two clock input signals and at least two outputs for outputting at least two delayed enabling signals and at least two enabling signals;
   at least two enable circuits, each of said enable circuits comprising an input for receiving one of the at least two clock input signals, an input for receiving one of said delayed enabling signals, an input for receiving one of said enabling signals and an output for outputting an internal clock signal; and
   a gate to receive the internal clock signals output by the at least two enable circuits and to output said clock output signal corresponding to the selected one of the at least two clock input signals,
   wherein said clock output signal is fed back to said select circuit so as to generate said at least two delayed enabling signals and said at least two enabling signals on the basis of said clock output signal,
   wherein said select circuit generates said at least two enabling signals on the basis of said selection signal, and
   wherein each of said at least two enable circuits comprises a gate for generating an internal enabling signal on the basis of said enabling signal and said delayed enabling signal.

2. The clock switch circuit according to claim 1, wherein said select circuit generates said at least two delayed enabling signals on the basis of said at least two enabling signals.

3. The clock switch circuit according to claim 2, wherein said at least two delayed enabling signals correspond to said at least two enabling signals delayed by half-clock period of said clock output signal.

4. The clock switch circuit according to claim 1, wherein said select circuit further comprises a decoder for generating said at least two enabling signals on the basis of said selection signal.

5. The clock switch circuit according to claim 1, wherein said select circuit comprises a synchronizer for synchronizing said selection signal in the clock domain of said clock output signal so as to generate a synchronized selection signal.

6. The clock switch circuit according to claim 5, wherein said select circuit further comprises a decoder for generating said at least two enabling signals on the basis of said synchronized selection signal.

7. The clock switch circuit according to claim 6, wherein said select circuit further comprises a delayer comprising a plurality of inputs for receiving said at least two enabling signals and said clock output signal and at least two outputs for outputting said at least two delayed enabling signals, said at least two delayed enabling signals being generated on the basis of said at least two enabling signals and said clock output signal.

8. The clock switch circuit according to claim 7, wherein said delayer delays said at least two enabling signals by half-clock period of said clock output signal.

9. The clock switch according to claim 1, wherein each of said at least two enable circuits comprises a synchronizer for synchronizing the delayed enabling signal in the clock domain of the clock input signal input in the enable circuit so as to generate synchronized delayed enabling signals.

10. The clock switch according to claim 1, wherein each of said at least two enable circuits comprises a clock gating cell for outputting said internal clock signal on the basis of said internal enabling signal and said clock input signal.

11. The clock switch according to claim 10, wherein said clock gating cell comprises a latch to receive in input said internal enabling signal and to be activated by said clock input signal and a gate for receiving in input the output of said latch and the clock input signal and for outputting the internal clock signal.

12. The clock switch according to claim 1, in combination with a divider, a clock multiplexer and a clock aligner to form a video pipeline.

13. A clock switch circuit for selectively generating a clock output signal from a selected one of at least two clock input signals, said clock switch circuit comprising:
a select circuit comprising an input for receiving a selection signal for selecting one of the at least two clock input signals and at least two outputs for outputting at least two delayed enabling signals and at least two enabling signals;
at least two enable circuits, each of said enable circuits comprising an input for receiving one of the at least two clock input signals, an input for receiving one of said delayed enabling signals, an input for receiving one of said enabling signals and an output for outputting an internal clock signal; and
a gate to receive the internal clock signals output by the at least two enable circuits and to output said clock output signal corresponding to the selected one of the at least two clock input signals,
wherein said select circuit is further provided with an input for receiving a select circuit test signal for performing tests on the clock switch circuit.

14. The clock switch circuit according to claim 13, wherein said clock output signal is fed back to said select circuit so as to generate said at least two delayed enabling signals on the basis of said clock output signal.

15. The clock switch circuit according to claim 14, wherein said select circuit generates said at least two enabling signals on the basis of said selection signal.

16. The clock switch circuit according to claim 15, wherein said select circuit generates said at least two delayed enabling signals on the basis of said at least two enabling signals.

17. The clock switch circuit according to claim 16, wherein said at least two delayed enabling signals correspond to said at least two enabling signals delayed by half-clock period of said clock output signal.

18. The clock switch circuit according to claim 13, wherein said select circuit further comprises a decoder for generating said at least two enabling signals on the basis of said selection signal.

19. The clock switch circuit according to claim 13, wherein said select circuit comprises a synchronizer for synchronizing said selection signal in the clock domain of said clock output signal so as to generate a synchronized selection signal.

20. The clock switch circuit according to claim 19, wherein said select circuit further comprises a decoder for generating said at least two enabling signals on the basis of said synchronized selection signal.

21. The clock switch circuit according to claim 20, wherein said select circuit further comprises a delayer comprising a plurality of inputs for receiving said at least two enabling signals and said clock output signal and at least two outputs for outputting said at least two delayed enabling signals, said at least two delayed enabling signals being generated on the basis of said at least two enabling signals and said clock output signal.

22. The clock switch circuit according to claim 21, wherein said delayer delays said at least two enabling signals by half-clock period of said clock output signal.

23. The clock switch circuit according to claim 13, wherein said select circuit is provided with a gate receiving in input said clock output signal and said select circuit test signal for performing tests on the clock switch circuit.

24. The clock switch circuit according to claim 13, wherein each of said at least two enable circuits receive in input at least an enable circuit test signal for performing tests on the clock switch circuit.

25. The clock switch circuit according to claim 24, wherein each of said at least two enable circuits comprises a synchronizer for synchronizing the delayed enabling signal in the clock domain of the clock input signal input in the enable circuit so as to generate synchronized delayed enabling signals.

26. The clock switch circuit according to claim 24, wherein each of said at least two enable circuits further comprises a gate for generating an internal enabling signal on the basis of said enabling signal and said synchronized delayed enabling signal, said gate being further operative to receive in input a first enable circuit test signal for performing tests on the clock switch circuit.

27. The clock switch circuit according to claim 26, wherein each of said at least two enable circuits comprises a clock gating cell for outputting said internal clock signal on the basis of said internal enabling signal and said clock input signal, said clock gating cell being further operative to receive in input a second enable circuit test signal for performing tests on the clock switch circuit.

28. The clock switch circuit according to claim 27, wherein said clock gating cell comprises a latch to receive in input said internal enabling signal and to be activated by said clock input signal and a gate for receiving in input the output of said latch and the clock input signal and for outputting the internal clock signal.

29. The clock switch circuit according to claim 28, wherein said clock gating cell further comprises a gate for receiving in input said internal enabling signal and said second enable circuit test signal, the output of said gate being connected with the input of said latch.

30. A digital clock controller for a video pipeline, said digital clock controller comprising a clock switch, a divider, a clock multiplexer and a clock aligner, wherein the clock switch comprises:
- a select circuit comprising an input for receiving a selection signal for selecting one of the at least two clock input signals and at least two outputs for outputting at least two delayed enabling signals and at least two enabling signals;
- at least two enable circuits, each of said enable circuits comprising an input for receiving one of the at least two clock input signals, an input for receiving one of said delayed enabling signals, an input for receiving one of said enabling signals and an output for outputting an internal clock signal; and
- a gate to receive the internal clock signals output by the at least two enable circuits and to output a clock output signal corresponding to the selected one of the at least two clock input signals, wherein said select circuit is further provided with an input for receiving a select circuit test signal for performing tests on the clock switch circuit.

* * * * *